(12) United States Patent
Kim

(10) Patent No.: US 6,675,084 B2
(45) Date of Patent: Jan. 6, 2004

(54) SYSTEM AND METHOD FOR CONTROLLING AN AUTOMATIC TRANSMISSION FOR USE IN AN AUTOMOBILE

(75) Inventor: Joung-Chul Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 34 days.

(21) Appl. No.: 10/028,137

(22) Filed: Dec. 20, 2001

(65) Prior Publication Data
US 2002/0087246 A1 Jul. 4, 2002

(30) Foreign Application Priority Data
Dec. 30, 2000 (KR) ......................... 2000-86847

(51) Int. Cl.⁷ .................. G06F 19/00; F16H 61/10
(52) U.S. Cl. ........................... 701/55; 701/64
(58) Field of Search ............... 701/55, 56, 51, 701/64, 66; 477/34, 97

(56) References Cited

U.S. PATENT DOCUMENTS

| 4,955,257 A | * | 9/1990 | Terayama et al. ............ 477/154 |
| 5,662,551 A |   | 9/1997 | Kamada |
| 5,868,033 A | * | 2/1999 | Nishino et al. ................ 74/335 |
| 5,885,188 A | * | 3/1999 | Iizuka .......................... 477/121 |
| 6,128,566 A | * | 10/2000 | Nishino ........................ 701/52 |
| 6,361,465 B1 | * | 3/2002 | Hirose .......................... 475/128 |

FOREIGN PATENT DOCUMENTS

JP          06-011033       *   1/1994

* cited by examiner

Primary Examiner—Michael J. Zanelli
(74) Attorney, Agent, or Firm—Pennie & Edmonds LLP

(57) ABSTRACT

A transmission control system for controlling a transmission is provided with a shift lever whose position is changeable through a lever-shifting action by a driver selecting a transmission stage to be changed into, a transmission stage detection unit for detecting a new position of the shift lever due to the lever-shifting action, and outputting corresponding signals, and a transmission control unit receiving the signals from the transmission stage detection unit and performing a gear-shifting operation of the transmission, the transmission control unit having therein a time map being of a number of values of permissible time intervals that respectively correspond to all kinds of gear-shifting operations of the transmission, the transmission control unit allowing the currently performed gear-shifting operation to be held only during a corresponding permissible time interval set in the time map in a case that it receives another transmission shift request while the gear-shifting operation is currently being performed, and then performing the newly requested gear-shifting operation.

7 Claims, 1 Drawing Sheet

SYSTEM AND METHOD FOR CONTROLLING AN AUTOMATIC TRANSMISSION FOR USE IN AN AUTOMOBILE

BACKGROUND OF THE INVENTION

The present invention relates to an automatic transmission for use in an automobile, and more particularly, to a transmission control system and method for controlling a transmission in the situation where a second transmission shift request occurs while a previous gear-shifting operation is still being performed.

In the typical prior art automatic transmission, if a new transmission shift request is input to a transmission control unit that is currently performing a prior gear-shifting operation, the transmission control unit triggers a gear-shifting operation of the newly requested transmission shift request immediately, regardless of whether the foregoing gear-shifting operation is completed.

Since the foregoing gear-shifting operation is abruptly stopped as soon as the new transmission shift request occurs, applying/releasing actions of hydraulic pressure of the foregoing gear-shifting operation are ceased in an unfinished state. In this situation, when the new gear-shifting operation for the new transmission shift request is immediately started, newly triggering application of the hydraulic pressure, there may be a shifting shock due to an interlock of the hydraulic pressure in some hydraulic ports or the like, degrading quality of the shifting operation of the transmission.

SUMMARY OF THE INVENTION

The present invention provides a transmission control system and method that is capable of preventing abnormal shifting shock from occurring when a new transmission shift request occurs while a prior gear-shifting operation is still being performed, and which is capable of completely performing the new gear-shifting operation of the new transmission shift request.

According to a preferred embodiment of the invention, the transmission control system comprises a shift lever whose position is changeable through a lever-shifting action by a driver selecting a transmission stage to be changed into; a transmission stage detection unit for detecting a new position of the shift lever due to the lever-shifting action, and outputting corresponding signals; and a transmission control unit receiving the signals from the transmission stage detection unit and performing a gear-shifting operation of the transmission. The transmission control unit contains a time map of a number of values of permissible time intervals that respectively correspond to all kinds of gear-shifting operations of the transmission. When a new transmission shift request is input to the transmission control unit while still performing the prior gear-shifting operation, the transmission control unit allows the currently performed prior gear-shifting operation to be held only during a corresponding permissible time interval set in the time map and then performs the newly requested gear-shifting operation.

In accordance with a preferred embodiment, the transmission control system further comprises a timer to monitor the time lapse relative to the permissible time interval and send signals corresponding to a current time to the transmission control unit. If the prior gear-shifting operation is completed before the permissible time interval is fully elapsed, the transmission control unit performs the new gear-shifting operation of the new transmission shift request immediately.

Further, the present invention provides a transmission control method comprising performing a first gear-shifting operation, determining whether a new transmission shift request exists while the first gear-shifting operation is being performed, obtaining a permissible time interval related to the first gear-shifting operation from a time map, if the new transmission shift request exists in the step (b), continuing to perform the first gear-shifting operation during the permissible time interval obtained from the time map, while delaying a new gear-shifting operation of the new transmission shift request, and performing the new gear-shifting operation after the permissible time interval has elapsed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
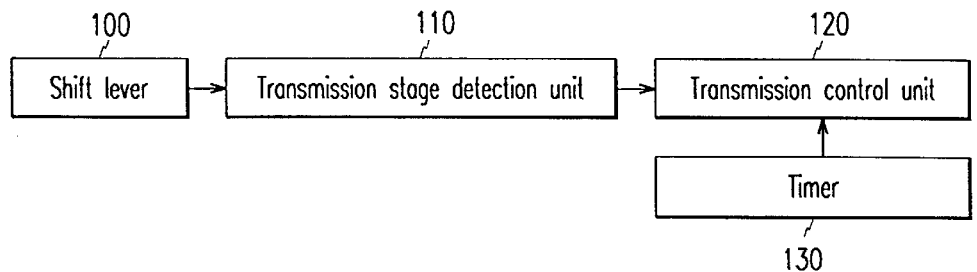
FIG. 1 is a block diagram of the system according to the present invention for controlling an automatic transmission for use in an automobile.

As shown in FIG. 1, an inventive transmission control system for use in an automobile is provided with a shift lever 100, a transmission stage detection unit 110, a transmission control unit 120, and a timer 130. A transmission stage to be changed into is selected by a lever-shifting action of the shift lever 100 by the driver. The transmission stage detection unit 110 detects a new position of the shift lever 100 due to the lever-shifting action and outputs corresponding signals.

The transmission control unit 120 receives the signals from the transmission stage detection unit 110, which correspond to the position of the shift lever 100 due to the lever-shifting action and performs the gear-shifting operation of the transmission. Further, the transmission control unit 120 has a time map being of a number of values of permissible time intervals that respectively correspond to the various gear-shifting operations of the transmission. When a new transmission shift request occurs while a prior gear-shifting operation is currently underway, the transmission control unit 120 allows the current, prior gear-shifting operation to continue only during the corresponding permissible time interval set in the time map and then performs the newly requested gear-shifting operation.

When the new transmission shift request occurs while the prior gear-shifting operation is still underway, timer 130 monitors the lapse of time relative to the permissible time interval, and sends signals corresponding to current time to the transmission control unit 120. Timer 130 may be established within the transmission control unit 120 as a part thereof.

Figure 2:
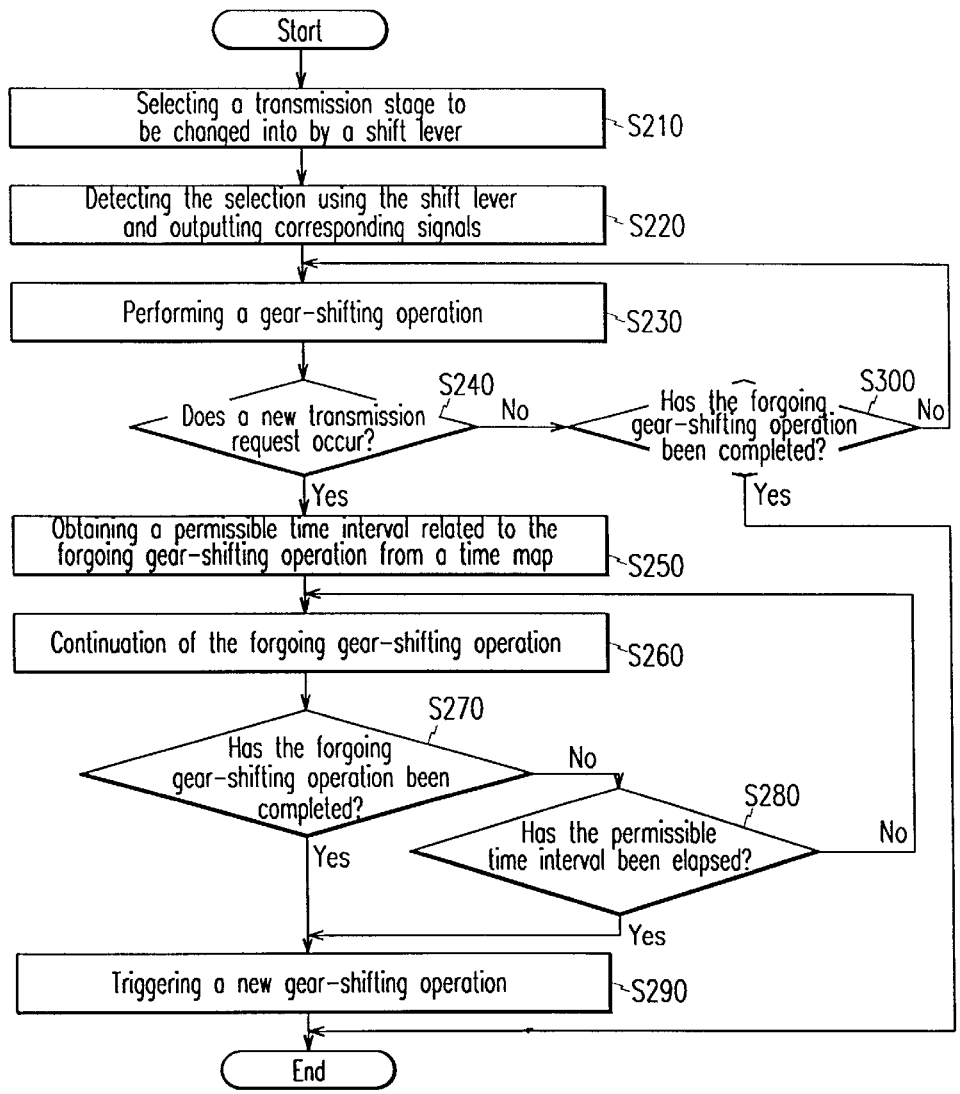
FIG. 2 is a flow chart illustrating a method according to the present invention for controlling an automatic transmission in a case where a new transmission shift request occurs while a prior gear-shifting operation is still being performed.

Hereinafter, a detailed description of the transmission control method for the case when a new transmission shift request occurs while a prior gear-shifting operation is still underway, in accordance with one embodiment of the present invention, is made with reference to FIG. 2. Firstly, when the driver selects a transmission stage to be changed into by manipulating the shift lever 100 (S210), the transmission stage detection unit 110 detects a change in position of the shift lever 100 and outputs signals corresponding to the change to the transmission control unit 120 (S220). Next, the transmission control unit 120, having received the signals corresponding to the position change of the shift lever 100, performs a related gear-shifting operation (S230).

For example, if the shift lever 100 is set at a position indicating the second gear ratio when the automobile runs in the first gear ratio, the transmission control unit 120 triggers a gear-shifting operation from the first gear ratio to the second gear ratio. Further, the gear-shifting operation may be made without the driver manipulating the shift lever 100, since the external environment, to which the transmission control unit refers in determining timing of gear shifting, changes while the shift lever 100 stays at a position indicating "Drive".

As described above, when the position of the shift lever 100 is changed or the gear-shifting operation has to be performed due to a change of the external environment, the transmission control unit 120 triggers a related gear-shifting operation. The transmission control unit 120 also determines whether any signals requesting a transmission shift are newly input thereto due to the fact that the position of the shift lever 100 is changed or the gear-shifting operation has to be performed due to a change of the external environment, while performing the related gear-shifting operation (S240).

If the signals are input during the gear-shifting operation triggered by the transmission control unit 120, the latter 120 obtains the permissible time interval related to the currently performed gear-shifting operation from the time map (S250).

For example, if a permissible time interval related to a gear-shifting operation from the first gear ratio to the second gear ratio is set at 0.0 seconds in the time map, the transmission control unit 120 will obtain 0.0 seconds as the permissible time interval. Further, if a permissible time interval related to a gear-shifting operation from the first gear ratio to the second gear ratio is set at 1.2 seconds in the time map, the transmission control unit 120 will obtain 1.2 seconds as the permissible time interval.

Next, the transmission control unit 120 continues to perform the first or prior gear-shifting operation, which is still being performed, while delaying a new gear-shifting operation of the new transmission shift request during the permissible time interval obtained from the time map (S260). If the permissible time interval is 0.0 seconds, the transmission control unit 120 immediately stops the prior gear-shifting operation and then performs the new gear-shifting operation of the new transmission shift request without delay. If the permissible time interval is 1.2 seconds, the transmission control unit 120 allows the first or prior gear-shifting operation to last for 1.2 seconds and then triggers the new gear-shifting operation of the new transmission shift request. If the prior gear-shifting operation is completed before the permissible time interval is fully elapsed (S270), the transmission control unit 120 immediately triggers the new gear-shifting operation of the new transmission shift request, rather than waiting for the lapse of the rest of the permissible time interval (S290).

Meanwhile, in the step S270, if the first or prior gear-shifting operation is not complete, the transmission control unit 120 determines whether the permissible time interval has elapsed (S280) and continues to perform the prior gear-shifting operation as in step S260 until the permissible time interval is fully elapsed.

On the other hand, in step S240 where it is determined whether there are other signals requesting the new transmission shift, if there is no signal requesting the new transmission shift, the transmission control unit 120 determines whether the prior gear-shifting operation is completed (S300). If the prior gear-shifting operation is not complete, the transmission control unit 120 continues to perform the prior gear-shifting operation as in the steps S230 and S260, whereas the transmission control method in accordance with one embodiment of the present invention is terminated if the prior gear-shifting operation is completed.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A transmission control system for controlling an automatic transmission when a new transmission shift request occurs while a prior gear-shifting operation is still being performed, comprising:

a shift lever whose position is changeable through a lever-shifting action by a driver selecting a transmission stage to be changed into;

a transmission stage detection unit for detecting a new position of the shift lever due to the lever-shifting action and outputting corresponding signals; and a transmission control unit receiving the signals from the transmission stage detection unit and performing a gear-shifting operation of the transmission, the transmission control unit having therein a time map of a number of values of permissible time intervals that respectively correspond to all kinds of gear-shifting operations of the transmission, and when the new transmission shift request is input to the transmission control unit currently performing a prior foregoing gear-shifting operation, the transmission control unit allows the prior gear-shifting operation to be held only during a corresponding permissible time interval set in the time map and then performs the newly requested gear-shifting operation.

2. The transmission control system of claim 1, further comprising a timer to monitor a lapse of time relative to the permissible time interval and send signals corresponding to a current time to the transmission control unit.

3. The transmission control system of claim 1, wherein the transmission control unit performs the new gear-shifting operation of the new transmission shift request immediately if the prior gear-shifting operation is completed before the permissible time interval is fully elapsed.

4. A transmission control method for controlling an automatic transmission when a new transmission shift request occurs while a prior gear-shifting operation is still being performed, the method comprising:

(a) performing a first gear-shifting operation;

(b) determining whether the new transmission shift request exists while the first gear-shifting operation is being performed;

(c) obtaining a permissible time interval related to the first gear-shifting operation from a time map; and (d) continuing to perform the first gear-shifting operation during the permissible time interval obtained from the time map, while delaying the new gear-shifting operation of the new transmission shift request.

5. The transmission control method of claim 4, further comprising, after step (b), determining whether or not the first gear-shifting operation is complete, and if the first gear-shifting operation is complete, performing the new gear-shifting operation of the new transmission shift request.

6. A system for controlling an automatic transmission, comprising:

a shift lever whose position is selectable by a driver;

a transmission stage detection unit for detecting said position of said range shift lever and outputting corresponding signals;

a transmission control unit for receiving environmental data and signals from said transmission stage detection unit and triggering a gear-shifting operation of the transmission;

a time map within said transmission control unit including a plurality of permissible time intervals corresponding to all possible gear-shifting operations of the transmission;

a timer to monitor a lapse of time relative to one of said permissible time intervals and send corresponding signals to a said transmission control unit;

wherein when the transmission is performing a first gear-shifting operation and a new shift request is generated by said transmission control unit in response to said environmental data or to said signals from said transmission stage detection unit, said transmission control unit allows said first gear-shifting operation to continue only during one of said permissible time intervals and thereafter triggers a second gear-shifting operation of the transmission in response to said new shift request.

7. The transmission control system of claim 6, wherein said transmission control unit triggers said second gear-shifting operation immediately if said first gear-shifting operation is completed before said permissible time interval is fully elapsed.

* * * * *